Dec. 10, 1968  I. L. BOESKOOL ET AL  3,415,346
STARTING CLUTCH FOR ENGINES
Filed Oct. 12, 1966  2 Sheets-Sheet 1

INVENTORS
IRVIN L. BOESKOOL
BY RICHARD GRAU

Barnes, Kisselle, Laisch & Choate
ATTORNEYS

Dec. 10, 1968   I. L. BOESKOOL ET AL   3,415,346
STARTING CLUTCH FOR ENGINES
Filed Oct. 12, 1966   2 Sheets-Sheet 2

INVENTORS
IRVIN L. BOESKOOL
RICHARD GRAU
BY
Barnes, Kisselle, Raisch & Choate
ATTORNEYS

United States Patent Office 3,415,346
Patented Dec. 10, 1968

3,415,346
STARTING CLUTCH FOR ENGINES
Irvin L. Boeskool and Richard Grau, Grand Rapids, Mich., assignors to Conductron Corporation, Ann Arbor, Mich., a corporation of Delaware
Filed Oct. 12, 1966, Ser. No. 586,090
5 Claims. (Cl. 192—21.5)

ABSTRACT OF THE DISCLOSURE

A starting assembly for a high speed engine such as a turbine engine which utilizes a prime mover such as an electric motor driving through a magnetic particle clutch, the assembly being so arranged that the clutch can be actuated utilizing the magnetic field to start and restart the engine but when the engine reaches a certain speed the magnetic particles will be centrifugally locked in a position wherein the clutch can no longer be engaged, thus making it impossible to overrun the clutch when the engine is operated. The invention also includes specific designs for reducing the inertia of the rotating parts by mounting the field-creating means in a stationary housing with a separate rotatable housing for retaining the magnetic particles, including a special hub arrangement for simultaneously mounting the toroidal coil and the rotatable portions of the clutch.

---

This invention relates to a starting clutch for engines and more particularly to a motor-clutch combination wherein a starting motor may be engaged with the shaft of an engine to be started for purposes of driving the engine up to starting speed after which the driving force is cut out.

The invention is particularly directed to a device for creating the starting torque for turbine engines. One of the problems in connection with the starting of turbine engines is that it may be desirable at any time to engage the cultch without shock at any relative speed between the turbine shaft and the driving shaft to avoid any delay in reaccelerating to the starting speed.

It is desirable to eliminate friction disc-like clutches which has a short service life and require adjustments from time to time for most effective use.

Another desirable feature of a clutch for this type of service is an automatic cut-out which will prevent engagement for speeds above a certain r.p.m. so that there can be no danger of overdrive on the starting motor. It is also desirable in a clutch of this type to maintain as low an inertia load as possible on the turbine shaft itself, and, more specifically in connection with magnetic clutch mechanism of the type to be described, it is desirable to reduce as much as possible any drag of the magnetic powder.

Another specific object of the invention is a provision of a clutch motor in connection with a turbine shaft which deenergizes at a certain speed to decouple the large inertia of the clutch output.

Another object is a centrifugally influenced seal which opens at a certain speed to reduce friction and drag, and closes at a predetermined lower speed when sealing is required.

Other objects and features of the invention will be apparent in the following description and claims wherein various modifications of the invention, the manner of making and using the same, and the principles of operation are set forth in connection with the best mode contemplated by the inventors.

Figure 1:
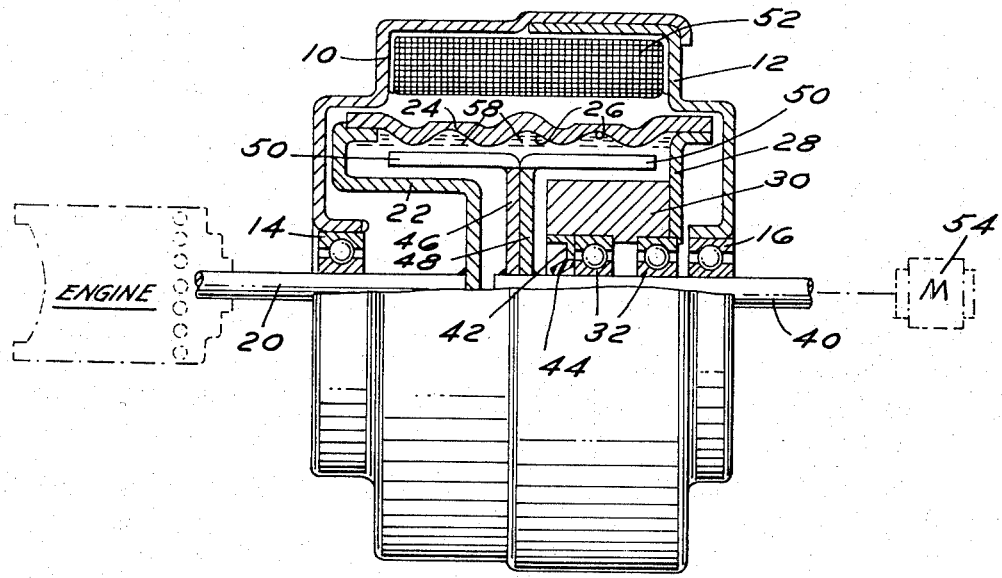

Drawings accompany the disclosure and the various views thereof may be briefly described as:

FIGURE 1, a view partially in section showing a magnetic clutch for the purpose designated.

Figure 2:
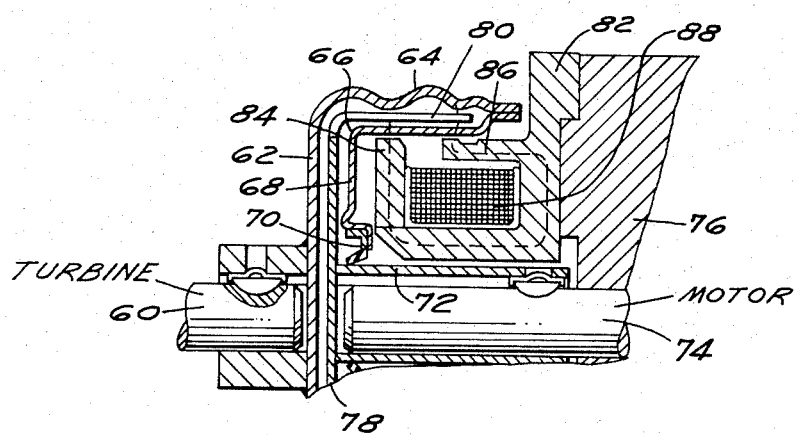

FIGURE 2, a modification showing an electromagnetic clutch wherein the powder chamber rotates at high speed.

Figure 3:
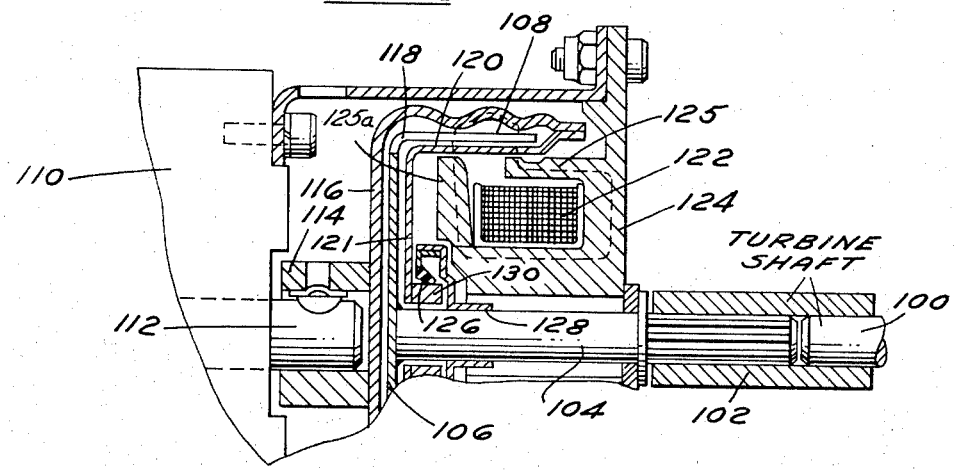

FIGURE 3, a modification showing a coupling with a lower inertia load on the shaft to be driven.

Figure 4:
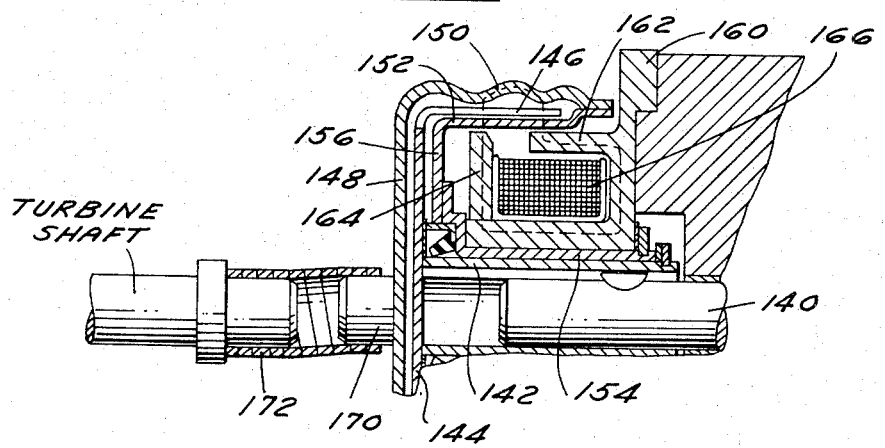

FIGURE 4, a device similar to FIGURE 2 whereby a secondary overrunning clutch permits automatic inertia reduction.

Referring to the drawings:

In FIGURE 1, the clutch is illustrated having an outer stationary housing formed of a shell 10 on one side closed by a shell 12 on the other side, each shell having a central opening enclosing respective bearings 14 and 16. At one end of the shell protrudes a turbine shaft 20 which is maintained to drive a turbine engine such as that commonly used in aircraft power plants.

This turbine shaft is connected to an annular rotatable housing formed of a dished plate 22 which is joined to close one end of an outer cylindrically shaped wall member 24 having an undulating shape on the inner surface to provide recesses 26 for purposes to be later described. The shape is preferably obtained by forming annular grooves in the wall 24. The other end of the cylindrical wall portion 24 is closed by a flanged disc 28 which carries a hub member 30, perferably of magnetic material, supported by bearings 32 on a starting motor shaft 40.

Between the shaft 40 and the hub 30 is a centrifugal seal 42 which has a lip portion 44 which will raise off the shaft centrifugally upon reaching a certain speed. At the left-hand of shaft 40 is mounted a rotor formed of two flanged discs 46 and 48 having equally extending axial flanges 50 which rotate in an area rather closely spaced to the inner surface of the wall 24. Within the annular rotatable housing formed by the elements 22, 24 and 28 is a quantity of electromagnetic powder which is selected suitably for the electromagnetic clutch properties required. Also, outside the wall 24 and within the housing elements 10–12, is an annular coil 52 which creates an electromagnetic field when energized to set up a friction clutch action in a known manner on the members 50 relative to the rotating housing 24 and its associated elements.

At rest, it will be seen that the seal 44 will retain any electromagnetic powder that may drift into its area. When the motor shaft 40 is rotated by a starting motor 54, the coil 52 is also energized in a circuit to attract the magnetic particles to the area of the rotating flange 50 and thus cause rotation of the composite housing carrying the wall 24 and ultimate rotation of the turbine shaft 20. The turbine shaft is thus rotated to operating speed and the turbine engine fired to make it self-propelling after which the motor is stopped and the shaft 40 with the associated elements 50 is brought to a stationary position.

In the meantime, the continued rotation of the turbine shaft keeps the magnetic particles indicated generally at 58 in the recesses created by the annular formations in the wall 24 and the drag on the overall housing is thus reduced to almost nothing. The undulating configuration also puts the low nodes in close proximity to the rotor flange within the annular housing to insure the proper magnetic effect in the clutch. In the meantime, the seal 44 rotating at the high speed of the turbine will lift off from the shaft 40 at a time when the magnetic particles are held outwardly by centrifugal force, further reducing the drag.

It will be seen also that in the high speeds of rotation, sometimes over 15,000 r.p.m. of the turbine engine, the electromagnetic particles 60 are held outwardly with such force that even energization of the coil 52 will not cause sufficient magnetic attraction to permit the particles to flow into the general field that would normally pass through the flanges 50, the hub 30 and so on. Thus, there is no possibility of the clutch becoming effective as long as the engine is rotating at a high speed, that is, running speed. On the other hand, at speeds up to starting speed, the clutch can be cut in and out without shock to the mechanism.

In FIGURE 2, a somewhat similar construction is shown, designed with a smaller axial dimension and with the stationary annular coil located inside instead of outside of the main rotating housing. The turbine shaft 60 connects to an annular rotatable housing formed from a disc 62 having an axial flanged wall 64 which is shaped to provide annular recesses in the undulating axial configuration, this wall having a parallel inner counterpart 66 spaced radially inwardly and extending centerward in a flange 68 associated with a centrifugal seal 70 which surrounds and relates to a tube 72 keyed to a motor shaft 74 suitably mounted in a motor housing 76. A rotor consisting of a radial disc 78 having an axial flange 80 is mounted on the tube 72, the flange 80 being spaced for relative rotation between walls 64 and 66.

On the motor housing 76 is a double flanged casting 82 preferably formed of electromagnetic material such as iron and carrying in the recess formed by removable flanges 84, and integral flange 86, an annular coil 88. When energized, this coil will create a magnetic field through the flanges of part 82 and the walls 64 and 66 as well as the flange 80 of the rotor disc 78. Thus, magnetic particles in the recess between walls 64 and 66 act in the energization of the magnetic field to cause mutual rotation of the two shafts 60 and 74, thus permitting the motor shaft to drive the turbine shaft up to a suitable starting speed. Here again, after the turbine has become self-empowered, the electromagnetic particles can nest in the spaces outside the rotor flange 80 and thus reduce the drag between the parts to practically zero while the turbine continues to rotate. And similarly, the centrifugal seal 70 will release itself at this speed again at a time when all magnetic particles are driven outwardly by the centrifugal force.

In FIGURE 3, the turbine shaft 100, by a suitable splined coupling tube 102, is connected to a shaft 104 which carries a rotor disc 106 and a flange 108. Thus, in this case, the turbine shaft is coupled to the moving part having the lowest inertia. The starting motor 110 has a shaft 112 keyed to a hub 114 carrying an annular rotatable housing formed from a disc 116 having an outer, shaped flange 118 joined with an inner, spaced flange 120 ending in an inwardly projecting apertured disc 121 concentric with shaft 104. The stationary electromagnetic coil 122 is mounted in the cast housing 124 between wall 125 and ring 125a to provide the electromagnetic field circuit for energizing the quantity of electromagnetic particles contained between the spaced walls 118 and 120. The centrifugal seal 126 is again provided, this time within a small sheet metal housing 128 on shaft 104. Here again, it will be seen that the seal is carried by the turbine shaft so that the high speed of the turbine shaft will create the centrifugal seal relief when it is not needed to retain the powder. This is accomplished by the housing 128 and in cooperation with an axially extending ring 130 on the radial disc extension 121 of flange 120.

In FIGURE 4, there is shown a similar type of structure to that shown in FIGURES 2 and 3, but with an additional feature of an overrunning spring clutch which has the advantage of decoupling when the turbine moves into self-empowerment and also the advantage of compensating for shaft misalignment. The motor shaft 140 is keyed to a tube 142 carrying the rotor disc 144 and the usual axially extending flange 146. The powder containing annular rotatable housing formed by the disc 148 and the radial walls 150 and 152 is supported for rotation on the tube 142 by a tube 154 having a suitable bearing relationship with tube 142 and flanged to join with a flange 156 extending radially inwardly from the wall 152. This tube 154 also has a bearing relationship with the inner cylindrical wall of housing 160 with the retaining wall 162 and ring wall 164 containing the coil 166.

A short stub shaft 170 on the clutch disc 148 is joined with the turbine shaft by a unidirectional helical spring clutch element 172. This clutch element will compensate for misalignment between the stub shaft 170 and the turbine shaft which eliminates some problems of mounting, and as soon as the turbine engine becomes self-empowered, it will immediately run away from the stub shaft 170 by reason of the slippage of the overrunning spring clutch. Thus, as long as the shaft 140 through the electromagnetic clutch is providing the power, the spring clutch will transmit it to the turbine shaft. The higher speed of the turbine shaft upon firing of the turbine engine will cause the spring to slip. The use of the spring clutch alone under these circumstances would provide too "hard" a clutch and there would be too much shock torque when the motor was started. The use of the magnetic particle clutch provides a soft start which is a desirable condition for this type of application and it also permits the motor to be used to bring the turbine shaft up to speed again should the motor start and then misfire before reaching speed. Thus, the soft clutch effect can be obtained at any range up to the starting speed of the engine.

In each embodiment shown, the rotor flange is preferably slotted axially to permit flow of magnetic particles, and thus prevent stagnation and overheating of the magnetic particles. Also, the annular rotatable housing in each case is preferably provided with annular grooves in the outer wall as shown to provide recesses to receive the magnetic particles moved outwardly by the centrifugal force at the high speeds of rotation. This reduces the drag on the clutch members when they are out of service.

In the appended claims, we have attempted to delineate the novelty of our device over known prior art for the purpose of defining the protected area as well as notifying the public relative to the unprotected area. However, we do intend by this claiming to cover any colorable variations, reversal of parts, or equivalents of the device which are within the scope and spirit of this disclosure and not anticipated by the prior art.

What is claimed as new is as follows:

1. A starting assembly for a high speed engine such as a turbine engine operable at starting speeds and automatically inoperable at engine operating speeds which comprises:
    (a) an engine,
    (b) a rotatable input member leading to said engine and driven by said engine when in operation,
    (c) a starting motor and a driving shaft driven thereby,
    (d) a stationary housing between said input and said driving shaft,
    (e) means supported by said housing to create an annular magnetic field,
    (f) an annular rotatable housing connected to said input member of said engine mounted for rotation within said magnetic field having a peripheral interior surface extending generally in the direction of the axis of rotation,
    (g) a quantity of magnetic powder within said annular rotatable housing distributable along said surface upon high speed rotation by said engine,
    (h) a rotor mounted for rotation within said rotatable housing having portions closely adjacent said peripheral interior surface also within said magnetic field, and (i) means connecting said rotor to said driving shaft of said starting motor, wherein simultaneous rotation of said starting motor and excitation of said magnetic field causes a transfer of torque by said magnetic powder from said rotor to said rotatable housing to drive said engine to a starting speed, said engine when operating serving to move said powder to said interior surface by centrifugal force to prevent torque transfer relative to said rotor even during excitation of said magnetic field.

2. A starting assembly for a high speed engine such as a turbine engine operable at starting speeds and automatically inoperable at engine operating speeds which comprises:
  (a) an engine,
  (b) a rotatable input member leading to said engine and driven by said engine when in operation,
  (c) a starting motor and a driving shaft driven thereby,
  (d) a stationary housing between said input and said driving shaft,
  (e) means supported by said housing to create an annular magnetic field,
  (f) an annular rotatable housing connected to said input member of said engine mounted for rotation within said magnetic field having a peripheral interior surface extending generally in the direction of the axis of rotation, said surface having spaced portions radially spaced at a greater distance from the axis of rotation than other intervening portions to provide pockets,
  (g) a quantity of magnetic powder within said annular rotatable housing distributable along said surface into said pockets upon high speed rotation by said engine,
  (h) a rotor mounted for rotation within said rotatable housing having portions closely adjacent said peripheral interior surface also within said magnetic field, and
  (i) means connecting said rotor to said driving shaft of said starting motor, wherein simultaneous rotation of said starting motor and excitation of said magnetic field causes a transfer of torque by said magnetic powder from said rotor to said rotatable housing to drive said engine to a starting speed, said engine when operating serving to move said powder to said interior surface by centrifugal force to prevent torque transfer relative to said rotor even during excitation of said magnetic field.

3. A starting assembly as defined in claim 1 in which the stationary housing serves as a support for said rotatable housing, said means for creating a magnetic field, and said rotor, said means being disposed radially inwardly of adjacent portions of said rotatable housing and said rotor to create an outwardly disposed magnetic field acting on powder in said rotatable housing.

4. A starting assembly as defined in claim 1 in which the stationary housing lies substantially radially within said annular housing, said annular housing being positioned to lie radially outside said means to set up an annular magnetic field, and said rotor comprises a flanged disc having an axially extending flanged portion positioned to rotate radially outside said stationary housing and within said annular housing.

5. A starting assembly as defined in claim 1 in which said stationary housing is shaped as a hub-like member having an annular outer recess to receive a toroidal coil to serve as the means to create an annular magnetic field, and having an inner bore containing a bushing to rotatably support telescoping, mutually rotatable axial projections on said rotatable housing and said rotor.

References Cited
UNITED STATES PATENTS

| | | | |
|---|---|---|---|
| 850,981 | 4/1907 | Tillotson | 192—81 |
| 2,541,831 | 2/1951 | Prince | 192—21.5 |
| 2,543,394 | 2/1951 | Winther | 192—21.5 |
| 2,752,800 | 7/1956 | Raymond et al. | 192—21.5 |
| 2,872,782 | 2/1959 | Johnson et al. | 60—39.14 |
| 3,088,565 | 6/1963 | Jaeschke | 192—21.5 |
| 3,086,631 | 4/1963 | Imperi | 192—21.5 |
| 3,250,341 | 5/1966 | Takahashi | 192—21.5 |

FOREIGN PATENTS

| | | |
|---|---|---|
| 470,838 | 1937 | Great Britain. |
| 772,893 | 4/1957 | Great Britain. |

CARLTON R. CROYLE, *Primary Examiner.*

C. LEEDOM, *Assistant Examiner.*